United States Patent
Bin Sediq et al.

(10) Patent No.: US 9,749,972 B2
(45) Date of Patent: Aug. 29, 2017

(54) SYSTEM AND METHOD FOR CLOCK SYNCHRONIZATION IN A WIRELESS BACKHAUL NETWORK USING IEEE 1588 PRECISION TIME PROTOCOL

(71) Applicant: BLiNQ WIRELESS INC., Ottawa (CA)

(72) Inventors: Akram Bin Sediq, Ottawa (CA); Ho Ting Cheng, Stittsville (CA)

(73) Assignee: BLiNQ Wireless Inc., Kanata (CA)

( * ) Notice: Subject to any disclaimer, the term of this patent is extended or adjusted under 35 U.S.C. 154(b) by 207 days.

(21) Appl. No.: 14/865,300

(22) Filed: Sep. 25, 2015

(65) Prior Publication Data

US 2016/0095075 A1    Mar. 31, 2016

Related U.S. Application Data

(60) Provisional application No. 62/055,045, filed on Sep. 25, 2014.

(51) Int. Cl.
| | | |
|---|---|---|
| H04J 11/00 | (2006.01) | |
| H04L 7/00 | (2006.01) | |
| H04W 56/00 | (2009.01) | |

(52) U.S. Cl.
CPC ................. H04W 56/001 (2013.01)

(58) Field of Classification Search
CPC ... H04L 1/0057; H04L 1/0071; H04L 5/0007; H04L 12/44; H04L 1/004; H04L 2027/0036; H04L 27/2601
See application file for complete search history.

(56) References Cited

U.S. PATENT DOCUMENTS

| | | | | |
|---|---|---|---|---|
| 8,300,749 B2* | 10/2012 | Hadzic | ................... | H03L 7/085 370/350 |
| 8,644,348 B2* | 2/2014 | Zampetti | ............... | H04J 3/0667 370/503 |

(Continued)

OTHER PUBLICATIONS

IEEE, "1588-2008—IEEE Standard for a Precision Clock Synchronization Protocol for Networked Measurement and Control Systems," Internet: http://standards.ieee.org/findstds/standard/1588-2008.html, Aug. 27, 2014.

(Continued)

*Primary Examiner* — Sai Aung
(74) *Attorney, Agent, or Firm* — de Wilton Intellectual Property Inc.

(57) ABSTRACT

A method and system is disclosed for clock synchronization in a wireless backhaul network, based on the IEEE1588 Precision Time Protocol (PTP). The network comprises a plurality of hubs, each hub serving one or more remote backhaul modules. Each hub comprises a slave clock, which communicates with a master clock through forward and reverse links. The method comprises, for each hub, estimating the frequency drift $\hat{\alpha}$ and offset $\hat{\beta}$ from the forward and reverse links between the master and slave clock, estimating the accuracy of $\hat{\alpha}$ and $\hat{\beta}$, determining the least congested link, and adjusting the frequency of the slave clock based on $\hat{\alpha}$ and $\hat{\beta}$ from the least congested link. A fixed or variable time window size is selected to achieve a desired accuracy of $\hat{\alpha}$ and $\hat{\beta}$. The method may comprise estimating a maximum holdover time for maintaining synchronization with a desired confidence level.

19 Claims, 10 Drawing Sheets

IEEE 1588 Propagation Delay
Message Exchange

(56) References Cited

U.S. PATENT DOCUMENTS

| | | | |
|---|---|---|---|
| 8,930,484 B2* | 1/2015 | Ranasinghe | H04J 3/0667 370/345 |
| 8,959,381 B2* | 2/2015 | Aweya | G06F 1/04 709/203 |

OTHER PUBLICATIONS

S.B. Moon, et al., "Estimation and removal of clock skew from network delay measurements", in Proc. Eighteenth Annual Joint Conference of the IEEE Computer and Communications Societies (INFOCOM '99), Mar. 21-25, 1999.

C. Iantosca et al., "Synchronizing IEEE 1588 clocks under the presence of significant stochastic network delays," in Proc. 2005 Conference on IEEE 1588, CH Winterthur, Oct. 2005.

ITU (International Telecommunications Union). "ITU-T G.8260 (2012), Definitions and terminology for synchronization in packet networks", Internet https://www.itu.int/rec/T-REC-G.8260/en.

Calnex Solutions Ltd., Application note: "Testing IEEE 1588v2 slave clocks CX5003", Internet http://www.calnexsol.com/downloads/application-notes-and-whitepapers.html.

M. Anyaegbu et al., "Dealing with Packet Delay Variation in IEEE 1588 Synchronization Using a Sample-Mode Filter," IEEE Intelligent Transportation Systems Magazine, vol. 5, No. 4, pp. 20-27, 2013.

\* cited by examiner

IEEE 1588 Propagation Delay
Message Exchange

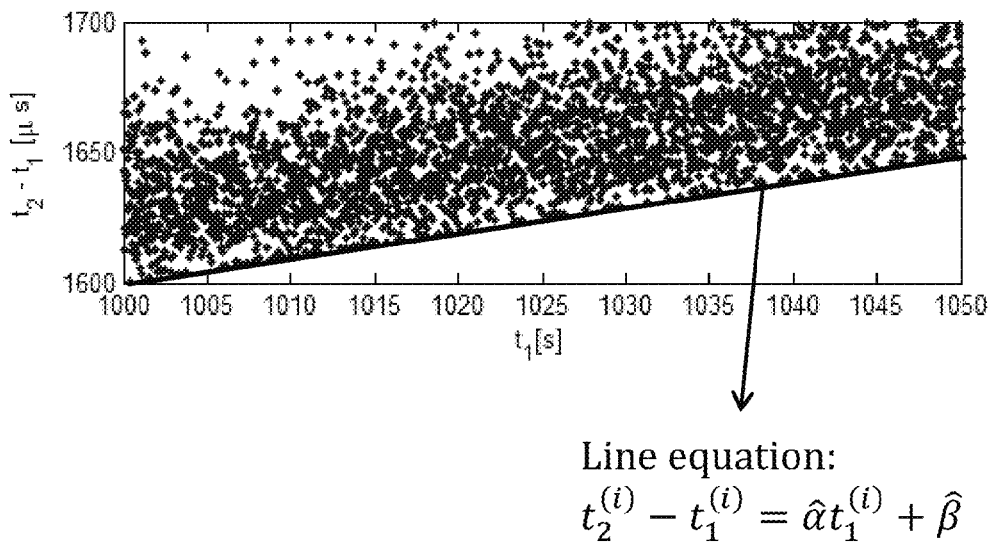
Line equation:
$$t_2^{(i)} - t_1^{(i)} = \hat{\alpha} t_1^{(i)} + \hat{\beta}$$
Fig. 4A  Before adjusting the frequency
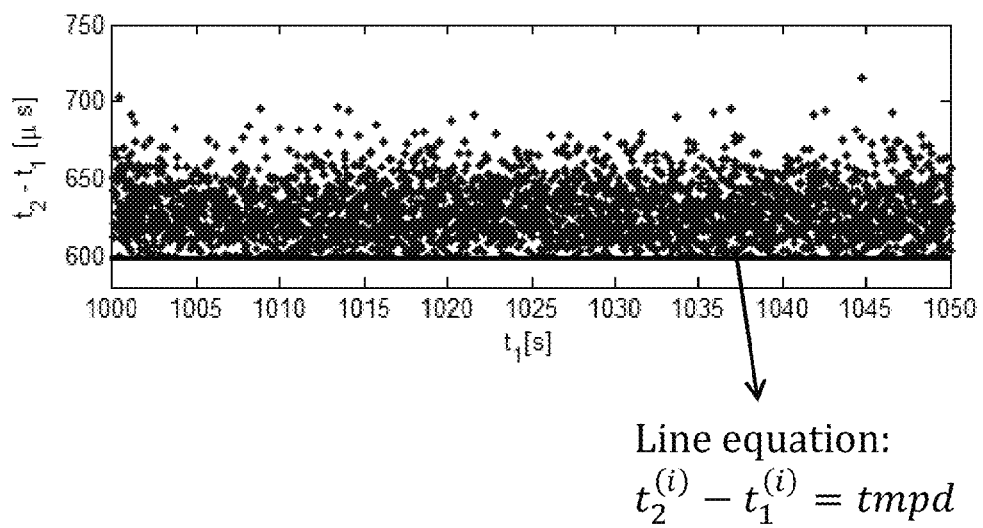
Line equation:
$$t_2^{(i)} - t_1^{(i)} = tmpd$$
Fig. 4B  After adjusting the frequency Actual freq. drift = 10 ppb
Estimated freq. drift = 9.51 ppb Actual beta = 600 μs
Estimated beta = 600.015 μs Fixed Window Size Variable Window Size ITU Test cases 12 to 16

ITU Test case 17

SYSTEM AND METHOD FOR CLOCK SYNCHRONIZATION IN A WIRELESS BACKHAUL NETWORK USING IEEE 1588 PRECISION TIME PROTOCOL

CROSS-REFERENCE TO RELATED APPLICATIONS

This application claims priority from U.S. Provisional patent application No. 62/055,045, filed Sep. 25, 2014, entitled "System and Method for Clock Synchronization in Wireless Backhaul Networks Based on IEEE 1588 Standard", which is incorporated herein by reference in its entirety.

TECHNICAL FIELD

The present invention relates generally to telecommunications service network technology, and more particularly to a system and method for clock synchronization in wireless backhaul networks using IEEE 1588 Precision Time Protocol.

BACKGROUND

Wireless backhaul networks are deployed to carry the traffic between a wireless access network and the core network. For example, a wireless backhaul network may comprise a plurality of hubs, each connected to the wired core network, via Ethernet. Each hub serves multiple remote backhaul modules (RBM), in a point-to-multipoint or point-to-point configuration, using a wireless channel. Each RBM is deployed close to an access network base station, such as a small cell base station, and connected to the base station via a cable. The hubs are deployed at the locations where wired, high capacity, access to the core network is available, e.g. at a fiber point-of-presence.

In this type of wireless backhaul network, time division duplexing (TDD) is used to separate the traffic transmitted from a hub to an RBM (downlink) and the traffic transmitted from an RBM to a hub (uplink). Thus, in multi-hub deployments, the hubs are required to be synchronized in time for efficient network operations. Thus each hub comprises a clock, and a method is required for synchronizing clocks of each hub.

The IEEE 1588 Precision Time Protocol (PTP) is a timing protocol used to synchronize distributed clocks throughout a network. For background information on IEEE 1588, and known methods for clock synchronization using PTP, reference is made to the following documents:
(1) "1588-2008—IEEE Standard for a Precision Clock Synchronization Protocol for Networked Measurement and Control Systems," Internet: http://standards.ieee.org/find-stds/standard/1588-2008.html, (Aug. 27, 2014);
(2) S. B. Moon, P. Skelly, and D. Towsley, "Estimation and removal of clock skew from network delay measurements", in *Proc. Eighteenth Annual Joint Conference of the IEEE Computer and Communications Societies (INFOCOM '99)*, 21-25 Mar. 1999, which discloses methods comprising linear programming for clock synchronization;
(3) C. Iantosca, C. Heitz, and H. Weibel, "Synchronizing IEEE 1588 clocks under the presence of significant stochastic network delays," in *Proc. 2005 Conference on IEEE 1588*, C H Winterthur, October 2005, which discloses methods comprising linear regression for clock synchronization;
(4) Recommendation ITU-T G.8260 (2012), Definitions and terminology for synchronization in packet networks (https://www.itu.int/rec/T-REC-G.8260/en);
(5) Application note: "Testing IEEE 1588v2 slave clocks CX5003" by Calnex Solution Ltd. (http://www.calnexsol.com/downloads/application-notes-and-whitepapers.html);
(6) M. Anyaegbu, C. Wang, and W. Berrie, "Dealing with Packet Delay Variation in IEEE 1588 Synchronization Using a Sample-Mode Filter," *IEEE Intelligent Transportation Systems Magazine*, vol. 5, no. 4, pp. 20-27, 2013.

The IEEE 1588 standard provides for a hierarchical master-slave architecture for synchronization of distributed network clocks, in which a high-precision clock exchanges timing information with a clock of each node in the network. The high-precision clock is referred to as the master clock, while the clock of each node is referred to as a slave clock. Based on the timing information exchanged between the master clock and each slave clock, each slave clock is adjusted in an effort to achieve synchronization with the master clock.

Timing information between the master and slave clocks is exchanged through the following two main types of message exchange, as illustrated schematically in FIG. 3:
  SYNC messages in the forward link (master-to-slave): The master clock periodically time-stamps packets and sends them to the slave clock, i.e., each transmitted packet i is time-stamped with $t_1^{(i)}$. Upon the reception of packet i, the slave clock time-stamps the received packet with $t_2^{(i)}$; and
  DELAY_REQ messages in the reverse link (slave-to-master): The slave clock periodically time-stamps packets and sends them to the master clock, i.e., each transmitted packet i is time-stamped with $t_3^{(i)}$. Upon the reception of packet i, the master clock time-stamps the received packet with $t_4^{(i)}$ and sends back $t_4^{(i)}$ to the slave clock.

Ideally, if both clocks are perfectly synchronized in frequency and phase, and if there is no queuing delay, then
  i. $t_2^{(i)} - t_1^{(i)} = tmpd$,
  ii. $t_4^{(i)} - t_3^{(i)} = tmpd$,
where tmpd is the mean propagation delay, assuming symmetry in the forward and reverse links.

However, due to frequency and phase offsets between the master and slave clocks, as well as queuing delay and time-stamping jitter, we have (Iantosca et al., ref. (3)):

$$t_2^{(i)} - t_1^{(i)} = tmpd + \alpha t_1^{(i)} + O + Q_F^{(i)} + J_F^{(i)},$$

$$t_4^{(i)} - t_3^{(i)} = tmpd - \alpha t_4^{(i)} - O + Q_R^{(i)} + J_R^{(i)},$$

where
  α is the frequency drift between the master clock and slave clock,
  O is the actual phase offset between the master clock and slave clock,
  $Q_F^{(i)}$, $Q_R^{(i)}$ are the non-negative random queuing delay with unknown probability distribution, in the forward and reverse direction, respectively,
  $J_F^{(i)}$, $J_R^{(i)}$ are the random jitter modelled as Gaussian random variable with zero mean and known standard deviation, in the forward and reverse direction, respectively.

Thus, the objective of clock synchronization is to continuously adjust the frequency of the slave clock so that the frequency drift between the master and slave clock is approximately zero, i.e. α≈0, and the actual phase offset between the master and slave clock is approximately zero, i.e. O≈0.

An object of the present invention is to provide an improved or alternative method and system for network-wide clock synchronization in communications networks, and more particularly a method and system for clock synchronization in wireless backhaul networks comprising fixed or stationary nodes, including small cell non-line-of-sight (NLOS) backhaul networks.

SUMMARY OF INVENTION

Aspects of the present invention provide a system and method for clock synchronization in communications networks, including wireless backhaul networks, using IEEE 1588 PTP.

Thus, one aspect of the present invention provides a method for clock synchronization in a fixed wireless backhaul network using IEEE1588 Precision Time Protocol (PTP), the wireless backhaul network comprising a plurality of fixed nodes, each node comprising a hub or a Remote Backhaul Module (RBM), wherein each hub serves one or more Remote Backhaul Modules (RBMs), and wherein each hub comprises a slave clock, and each slave clock communicates with a master clock through a forward link (master-to-slave) and a reverse link (slave-to-master), the method comprising, for each slave clock, the steps of:

for a frame rate of $F_t$ and a time window size W, during each time window W, obtaining a plurality of time-stamps, comprising $t_1$ and $t_2$, for the forward link and $t_3$ and $t_4$, for the reverse link, and storing said plurality of time stamps;

determining from said stored time stamps, for said time window W, an estimated frequency drift $\hat{\alpha}$ and estimated offset $\hat{\beta}$ for each of the forward and reverse links;

determining an estimation error $\Delta\hat{\alpha}$ of the estimated drift frequency drift $\hat{\alpha}$ and an estimation error $\Delta\hat{\beta}$ of the estimated offset $\hat{\beta}$ for each of the forward and reverse links;

determining which of the forward and reverse links is a least congested link; and if the estimation errors $\Delta\hat{\alpha}$ and $\Delta\hat{\beta}$ of the least congested link are less than or equal to a predefined maximum estimation error, adjusting the slave clock based on said estimated frequency drift $\hat{\alpha}$ and estimated offset $\hat{\beta}$ of the least congested link;

otherwise, changing the window size and repeating the preceding steps until the estimation errors $\Delta\hat{\alpha}$ and $\Delta\hat{\beta}$ of the least congested link are less than or equal to a predefined maximum estimation error, or, declaring loss of synchronization.

If the estimation error errors $\Delta\hat{\alpha}$ and $\Delta\hat{\beta}$ of the least congested link are greater than the maximum estimation error, the method may comprise incrementally increasing the time window size by a factor c, where c is greater than one, and repeating said steps until the estimation errors $\Delta\hat{\alpha}$ and $\Delta\hat{\beta}$ of the least congested link are less than or equal to the predefined maximum estimation error.

If the estimation error errors $\Delta\hat{\alpha}$ and $\Delta\hat{\beta}$ of the least congested link are less than or equal to the maximum estimation error, the method may comprise successively decreasing the time window size by an amount $\Delta W$ and repeating the preceding steps to find a minimum window size that provides estimation errors $\Delta\hat{\alpha}$ and $\Delta\hat{\beta}$ of the least congested link that are less than or equal to the predefined maximum estimation error.

The least congested link of the forward and reverse links may be determined as the link that results in the least estimation error.

The method may further comprise, for each of the forward and reverse links, applying packet delay filtering to identify a plurality of lucky packets in said time window W, and applying linear regression on the plurality of lucky packets to obtain the estimated frequency drift $\hat{\alpha}$ and estimated offset $\hat{\beta}$.

In an embodiment, determining estimated frequency drift frequency drift $\hat{\alpha}$ and estimated offset $\hat{\beta}$ for the forward and reverse links comprises:

for the forward link, determining intermediate drifts and offset values $\tilde{\alpha}, \tilde{\beta}$, by solving the following optimization:

$$\min_{\tilde{\alpha},\tilde{\beta}} \sum_{i=1}^{WF_t} |t_2^{(i)} - t_1^{(i)} - \tilde{\alpha}(t_1^{(i)} - t_1^{(1)}) - \tilde{\beta}|$$

subject to $$t_2^{(i)} - t_1^{(i)} \geq \tilde{\alpha}(t_1^{(i)} - t_1^{(1)}) + \tilde{\beta}, \forall i \in \{1, \ldots, WF_t\}$$

performing packet delay filtering (PDV) comprising applying packet filtering using the said intermediate values $\tilde{\alpha}, \tilde{\beta}$, to identify lucky packets that satisfy the following condition:

$$LP = \{i : t_2^{(i)} - t_1^{(i)} \leq \tilde{\alpha}(t_1^{(i)} - t_1^{(1)}) + \tilde{\beta} + 6\sigma_J\}$$

$n_{LP} = |LP|$, number of lucky packets applying linear regression on the lucky packets to find the said estimated frequency drift frequency drift $\hat{\alpha}$ and estimated offset $\hat{\beta}$;

and correspondingly, for the reverse link, determining intermediate drifts and offset values $\tilde{\alpha}, \tilde{\beta}$, by replacing $t_1$ with $t_4$ and $t_2 - t_1$ with $t_4 - t_3$) in the above optimization; and defining the offset in forward link as $O = \hat{\beta} - \text{tmpd}$ and in the reverse link as $O = -(\hat{\beta} - \text{tmpd})$.

The method may further comprise performing jitter filtering using linear regression comprising:

for the forward link, let x, y, be two $n_{LP} \times 1$ vectors, given by $$x = \{t_1^{(i)} - t_1^{(i)} : i \in LP\}, \quad y = \{t_2^{(i)} - t_1^{(i)} : i \in LP\}$$

and the estimated frequency drift and offset are given by $$\hat{\alpha} = \frac{(x - \bar{x})^T(y - \bar{y})}{(x - \bar{x})^T(x - \bar{x})},$$

$$\hat{\beta} = \bar{y} - \hat{\alpha}\bar{x}$$

and, correspondingly, for the reverse link, replacing $t_1$ with $t_4$ and $t_2 - t_1$ with $t_4 - t_3$ in the above equations.

For a given Confidence level, CL %, the method may comprise estimating the estimation errors on $\hat{\alpha}$ and $\hat{\beta}$, denoted by $\Delta\hat{\alpha}$ and $\Delta\hat{\beta}$, respectively, such that $\alpha \in [\hat{\alpha} - \Delta\hat{\alpha}, \hat{\alpha} + \Delta\hat{\alpha}]$ and $\beta \in [\hat{\beta} - \Delta\hat{\beta}, \hat{\beta} + \Delta\hat{\beta}]$;

let $t_{n_{LP}-2}^*$ denote the $(1-(1-CL/100)/2)$ quantile of student $t_{n_{LP}-2}$ distribution (Student's t-distribution with $n_{LP} - 2$ degrees of freedom);

$$\text{let } S_\alpha = \sqrt{\frac{\frac{1}{n_{LP}-2}(y - (\hat{\alpha}x + \hat{\beta}))^T(y - (\hat{\alpha}x + \hat{\beta}))}{(x - \bar{x})^T(x - \bar{x})}},$$

-continued $$S_\beta = S_\alpha \sqrt{\frac{x^T x}{n_{LP}}} ;$$

then, the estimation errors are given by $$\Delta\hat{\alpha} = S_\alpha t_{n_{LP}-2}^*$$

$$\Delta\hat{\beta} = S_\beta t_{n_{LP}-2}^*$$

For CL=99%, the following approximation may be used $$t_{n_{LP}-2}^* \approx 2.578 + 26660 e^{-2.0265 n_{LP}}$$

In an embodiment, determining the least congestion link of the forward and reverse links comprises selecting the link that results in the largest number of lucky packets.

The method may further comprise:
determining the maximum tolerable synchronization error, MaxSynchError, between the master clock and slave clock;
determining a target confidence level for synchronization; and
declaring loss of synchronization if $$|\hat{\beta} - tmpd| + \Delta\hat{\beta} \geq \text{MaxSynchError}$$

where tmpd is the mean propagation delay.

The method may further comprise:
determining a target confidence level for synchronization, MaxSynchError; and computing a maximum holdover time as:

$$\text{Maximum hold over time} = \max\left(\frac{|\text{MaxSynchError} - (\hat{\beta} - tmpd)| + \Delta\hat{\beta}}{\min(|\hat{\alpha} + \Delta\hat{\alpha}|, |\hat{\alpha} - \Delta\hat{\alpha}|)}, 0\right)$$

where $\hat{\beta}$ is the estimated offset, $\Delta\hat{\beta}$ is the estimation error on $\hat{\beta}$, $\hat{\alpha}$ is the estimated drift, $\Delta\hat{\alpha}$ is the estimation error on $\hat{\alpha}$, and tmpd is the mean propagation delay.

Another aspect of the invention provides a system for clock synchronization using IEEE1588 precision time protocol (PTP) in a fixed wireless backhaul network comprising a plurality of nodes, said nodes comprising hubs and Remote Backhaul Modules (RBMs), wherein each hub serves one or more Remote Backhaul Modules (RBMs), each hub comprising a slave clock, and wherein each slave clock communicates with a master clock through a forward link (master-to-slave) and a reverse link (slave-to-master), and processor means comprising at least one processor and a computer readable storage medium, storing programming instructions for execution by said at least one processor, for implementing the claimed method.

In one embodiment, the system comprises a second order control loop, e.g. the processing unit comprises a proportional integral (PI) controller.

Yet another aspect of the invention provides a computer readable storage medium in a fixed wireless backhaul network comprising a plurality of nodes, said nodes comprising hubs and Remote Backhaul Modules (RBMs), wherein each hub serves one or more Remote Backhaul Modules (RBMs), each hub comprising a slave clock, and wherein each slave clock communicates with a master clock through a forward link (master-to-slave) and a reverse link (slave-to-master), the computer readable storage medium storing programming instructions for execution by said at least one processor, for implementing the claimed method.

Thus, the present invention provides a method, system and software for clock synchronization using IEEE1588 PTP in wireless backhaul networks.

The foregoing, and other objects, features, aspects and advantages of the present invention will become more apparent from the following detailed description, taken in conjunction with the accompanying drawings of preferred embodiments of the invention, which description is by way of example only.

BRIEF DESCRIPTION OF DRAWINGS

FIG. 4A shows a plot of $t_2-t_1$ (μs) vs. time (s) for a plurality of frames, before synchronization, and FIG. 4B shows a plot of $t_2-t_1$ (μs) vs. time (s) for a plurality of frames, after synchronization;

FIG. 7A shows a plot of the frequency uncertainty in parts-per-billion (ppb), which reflects the inaccuracy in estimating the drift, for a fixed window size, for ITU test case 14a;

FIG. 7B shows a plot of the frequency uncertainty in parts-per-billion (ppb), for a variable window size, for ITU test case 14a;

DETAILED DESCRIPTION OF EMBODIMENTS

A system and method for clock synchronization in a fixed wireless backhaul network will be described, by way of example, with reference to a NLOS wireless backhaul network 100 as illustrated schematically in FIG. 1, which represents schematically the topology of a system comprising a point-to-multipoint wireless backhaul network, comprising a plurality of fixed nodes. The nodes comprise a plurality of Hubs 102 and RBMs 104, and each Hub serves one or more RBMs.

Figure 1:
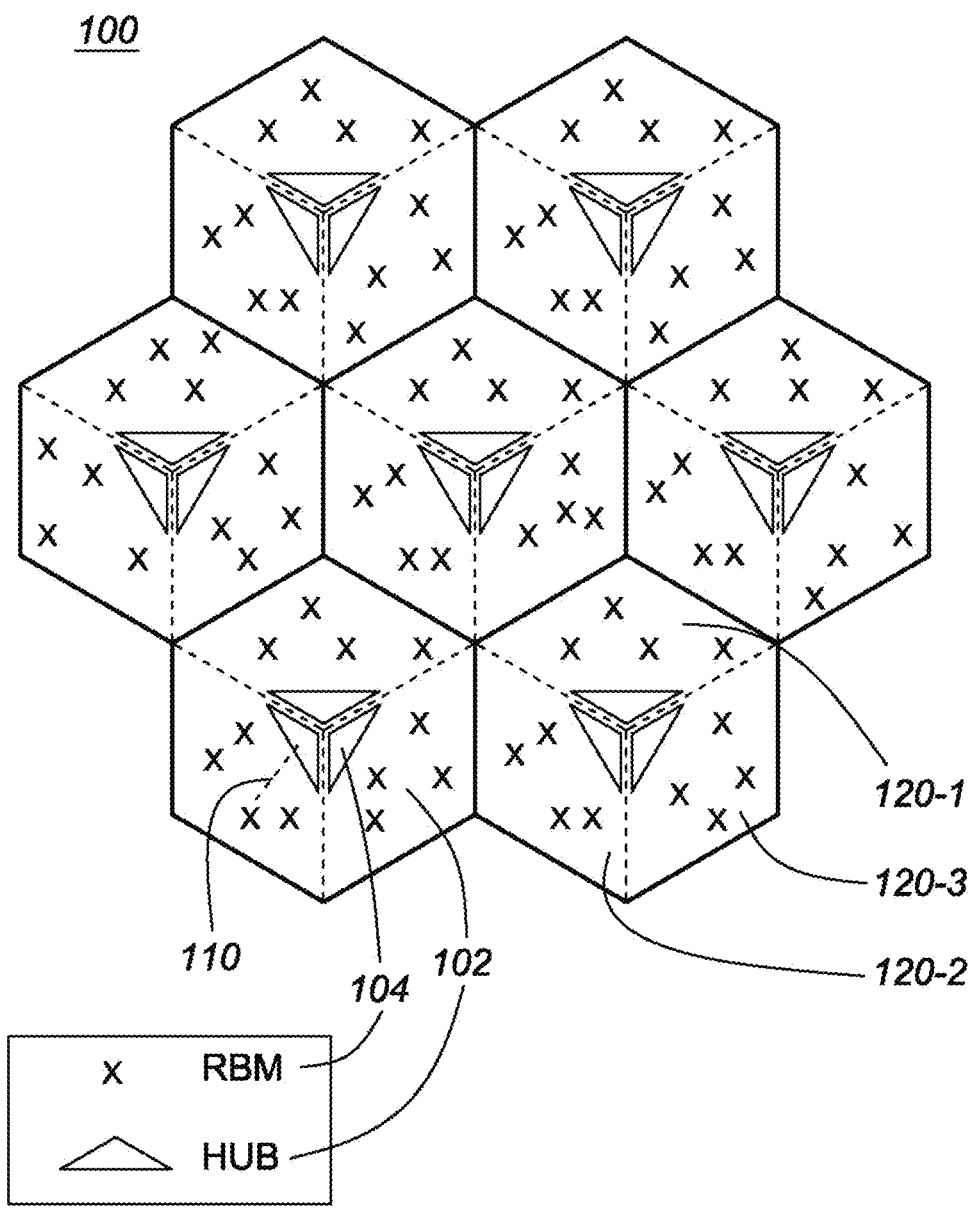
FIG. 1 shows a schematic diagram of a wireless backhaul network, comprising a plurality of Hubs, each Hub serving a plurality of Remote Backhaul Modules (RBMs), for implementing a method for clock synchronization using IEEE 1588 PTP according to an embodiment of the present invention.

As an example only, the wireless backhaul network 100 shown in FIG. 1 comprises a plurality of seven sites or cells, each site comprising three Hub modules 102, with each Hub module serving a sector 120 comprising a cluster of a plurality of Remote Backhaul Modules (RBMs) 104. Thus, there are 21 sectors, each with a Hub module 102 serving a cluster of up to four RBMs. As shown, three Hubs modules 102, each with directional antenna, are co-located in each of the cell centers, with a cluster of RBMs mapped to each respective serving Hub, in each of the three sectors 120-1, 120-2, 120-3 of the cell.

Figure 2:
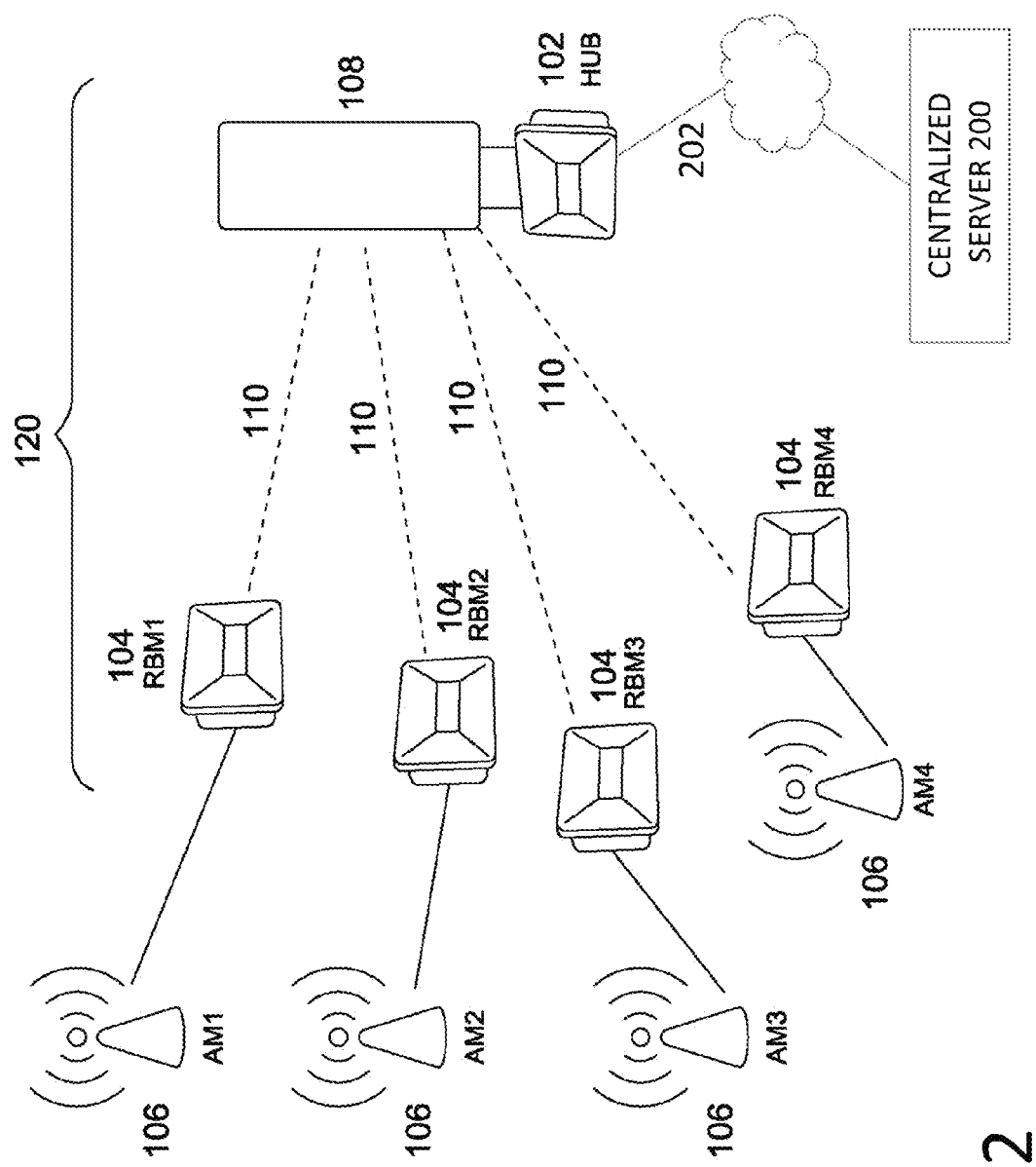
FIG. 2 shows a schematic diagram of part of the wireless backhaul network of FIG. 1, comprising one cluster of four RBMs served by a Hub module, each RBM being connected to an access module of an access network, and wherein the Hub has a connection to a centralized control server.

In each sector 120, a Hub 102 serves its set or cluster of Remote Backhaul Modules (RBMs) 104 through wireless links (Hub-RBM radio links) 110, as shown schematically in FIG. 2. Each RBM 104 communicates with and is co-located with an access module (AM) 108 of an access network, such as a small cell-base station, using a wired connection, e.g. an Ethernet cable. The Hub module 102 may have a multi-beam antenna 108 and RBMs 104 each have an integrated directional antenna system that is directed towards the Hub. Unlike a multi-hop architecture, each radio link 110, comprising uplink and downlink, comprises only one hop from each RBM 104 to a respective Hub to carry the traffic. The backhaul network operates at a different frequency band from that of the access network. Also shown in FIG. 2 is a communications link 202 from the Hub 102 to a centralized server or controller 200, for managing control functions of the wireless backhaul network.

Time division duplexing (TDD) is used to separate the traffic transmitted from a hub to an RBM (downlink) and the traffic transmitted from an RBM to a hub (uplink). Thus, in multi-hub deployments, the hubs are required to be synchronized in time for efficient network operations. Each hub comprises a clock to enable synchronization of network operations and a method is required for synchronizing the clock of each hub, which will be referred to as a "slave clock", with a high-precision clock or "master clock".

The system and method for clock synchronization disclosed herein provides for synchronization of each slave clock, i.e. clocks located in each hub, with a high-precision master clock, based on the IEEE 1588 precision time protocol.

For application to the wireless backhaul network, the master clock may be a Grand Master high precision network clock outside the wireless backhaul network, i.e. an internet accessible master clock. It may alternatively be a high precision master clock provided in a centralized server/control node of the wireless backhaul network. The clock of the centralized server may act as a boundary clock, i.e. act as a master clock for the wireless backhaul network, which itself maintains close synchronization with a best master or grand master clock outside the wireless backhaul network.

Thus, in an embodiment, each hub comprises a slave clock and a processing unit for implementing synchronization of the hub with its designated master clock.

Figure 3:
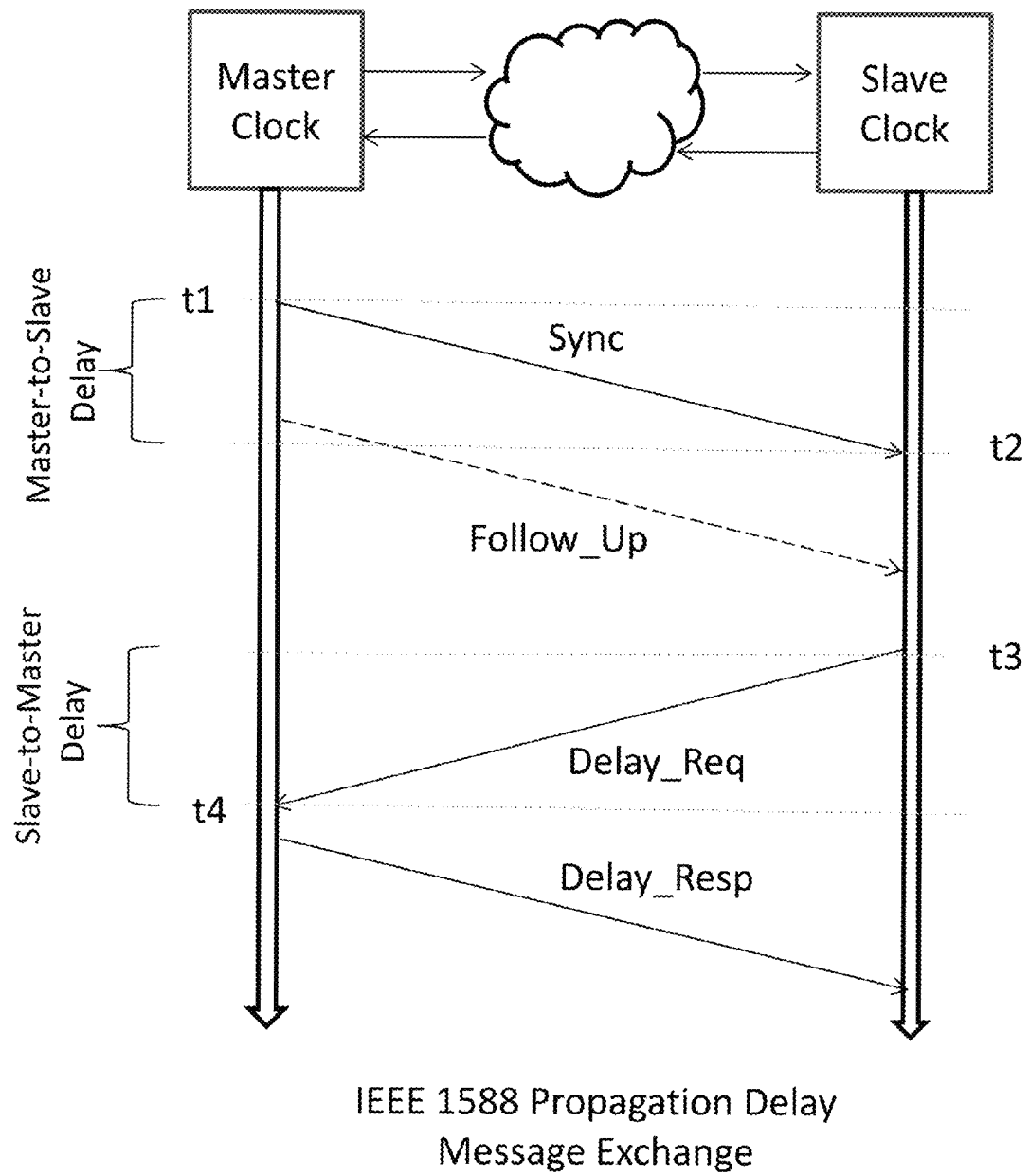
FIG. 3 shows a schematic diagram illustrating messaging according to IEEE 1588 PTP.

Considering synchronization of each hub with its respective master clock, and referring FIG. 3, ideally, if both the master clock and a slave clock in a hub are perfectly synchronized in frequency and phase, and if there is no queuing delay, then i. $t_2^{(i)} - t_1^{(i)} = \text{tmpd}$,
ii. $t_4^{(i)} - t_3^{(i)} = \text{tmpd}$, where tmpd is the mean propagation delay, assuming symmetry in the forward and reverse links.

However, due to the frequency and phase offset between the master and slave clocks, as well as, queuing delay and time-stamping jitter, we have (Iantosca et al. [3]):

$$t_2^{(i)} - t_1^{(i)} = tmpd + \alpha t_1^{(i)} + O + Q_F^{(i)} + J_F^{(i)},$$

$$t_4^{(i)} - t_3^{(i)} = tmpd - \alpha t_4^{(i)} - O + Q_R^{(i)} + J_R^{(i)},$$

where
  α: the frequency drift between the master clock and slave clock,

O: the actual phase offset between the master clock and slave clock, $Q_F^{(i)}$, $Q_R^{(i)}$: non-negative random queuing delay with unknown probability distribution, in the forward and reverse direction, respectively, $J_F^{(i)}$, $J_R^{(i)}$: random jitter modelled as Gaussian random variable with zero mean and known standard deviation, in the forward and reverse direction, respectively.

To implement clock synchronization, in practice, it is required to obtain estimates of the frequency drift $\hat{\alpha}$ and offset $\hat{\beta}$.

The following notations are introduced:
iii. $\hat{\alpha}_{12}$: estimated frequency drift in the forward link,
iv. $\hat{\alpha}_{34}$: estimated frequency drift in the reverse link,
v. $\hat{O}$: estimated actual offset
vi. $\hat{\beta}_{12}$: estimated offset in the forward link, where $\hat{\beta}_{12} = \text{tmpd} + \hat{O}$,
vii. $\hat{\beta}_{34}$: estimated offset in the reverse link, where $\hat{\beta}_{34} = \text{tmpd} - \hat{O}$.

For simplicity, in the following description, we refer in the following to the estimated frequency drift $\hat{\alpha} \in \{\hat{\alpha}_{12}, \hat{\alpha}_{34}\}$ and the estimated offset a $\hat{\beta} \in \{\hat{\alpha}_{12}, \hat{\beta}_{34}\}$.

The overall methodology for synchronizing the slave clock and the master clock is to continuously adjust the frequency of the slave clock to make the frequency drift a $\alpha \approx 0$ and the offset $O \approx 0$. This is done through the following three steps:

i. Collecting time-stamps $t_1^{(i)}$, $t_2^{(i)}$, $t_3^{(i)}$, $t_4^{(i)}$ for a time window of W seconds.
ii. Based on the collected time-stamps, estimating the current frequency drifts and offsets $\hat{\alpha}_{12}$, $\hat{\alpha}_{34}$, $\hat{\beta}_{12}$, $\hat{\beta}_{34}$, respectively.
iii. Using the estimates $\hat{\alpha}_{12}$, $\hat{\alpha}_{34}$, $\hat{\beta}_{12}$, $\hat{\beta}_{34}$, adjusting the frequency of the slave clock.

As an example, to illustrate the objective of the method, FIGS. 4A and 4B show, respectively, plots $t_2 - t_1$ vs. time for experimental data, before and after adjusting the frequency of the slave clock. As shown in FIG. 4A, the line equation is given by $t_2^{(i)} - t_1^{(i)} = \hat{\alpha} t_1^{(i)} + \hat{\beta}$. As illustrated in FIG. 4B, after adjusting the frequency of the slave clock, the line equation is given by $t_2^{(i)} - t_1^{(i)} = \text{tmpd}$ In a method according to one embodiment of the present invention, estimating the frequency drift $\hat{\alpha}_{12}$ and offset $\hat{\beta}_{12}$ in the forward link comprises:

Step 1: Collecting time-stamps $t_1^{(i)}$, $t_2^{(i)}$ for a time window of W seconds, assuming the packet rate is $F_t$, and the total number of time-stamps collected is $WF_t$ Step 2: Finding intermediate values of $\tilde{\alpha}_{12}$, $\tilde{\beta}_{12}$, e.g. using the algorithm in disclosed by Iantosca et al. in ref. (3), by solving the following optimization problem:

$$\min_{\tilde{\alpha}_{12}, \tilde{\beta}_{12}} \sum_{i=1}^{WF_t} |t_2^{(i)} - t_1^{(i)} - \tilde{\alpha}_{12}(t_1^{(i)} - t_1^{(1)}) - \tilde{\beta}_{12}|$$

subject to $$t_2^{(i)} - t_1^{(i)} \geq \tilde{\alpha}_{12}(t_1^{(i)} - t_1^{(1)}) + \tilde{\beta}_{12}, \forall i \in \{1, \ldots, WF_t\}$$

Step 3: Packet filtering to identify the lucky packets (LP) that satisfy the following condition:

$$LP = \{i : t_2^{(i)} - t_1^{(i)} \leq \hat{\alpha}_{12}(t_1^{(i)} - t_1^{(i)}) + \hat{\beta}_{12} + 6\sigma_J\}$$

where $n_{LP} = |LP|$, number of lucky packets and $\sigma_J$ is the known standard deviation of a random jitter in the forward direction.

Step 4: Jitter filtering using linear regression comprising:
Let x, y, be two $n_{LP} \times 1$ vectors, given by $$x=\{t_1^{(i)}-t_1^{(1)}: i \in LP\}, \; y=\{t_2^{(i)}-t_1^{(i)}: i \in LP\}.$$

and obtaining the estimated $\hat{\alpha}_{12}$ and $\hat{\beta}_{12}$ using linear regression $$\hat{\alpha}_{12} = \frac{(x-\bar{x})^T(y-\bar{y})}{(x-\bar{x})^T(x-\bar{x})},$$

$$\hat{\beta}_{12} = \bar{y} - \hat{\alpha}_{12}\bar{x}$$

Accordingly, for the reverse link, the steps above can be used for estimating the frequency drift $\hat{\alpha}_{34}$ and offset $\hat{\beta}_{34}$ in the reverse link by replacing $t_1$ with $t_4$ and $(t_2-t_1)$ with $(t_4-t_3)$.

Then, in forward link, the offset $O=\hat{\beta}-tmpd$; and, in the reverse link, the offset $O=-(\hat{\beta}-tmpd)$.

Figure 5:
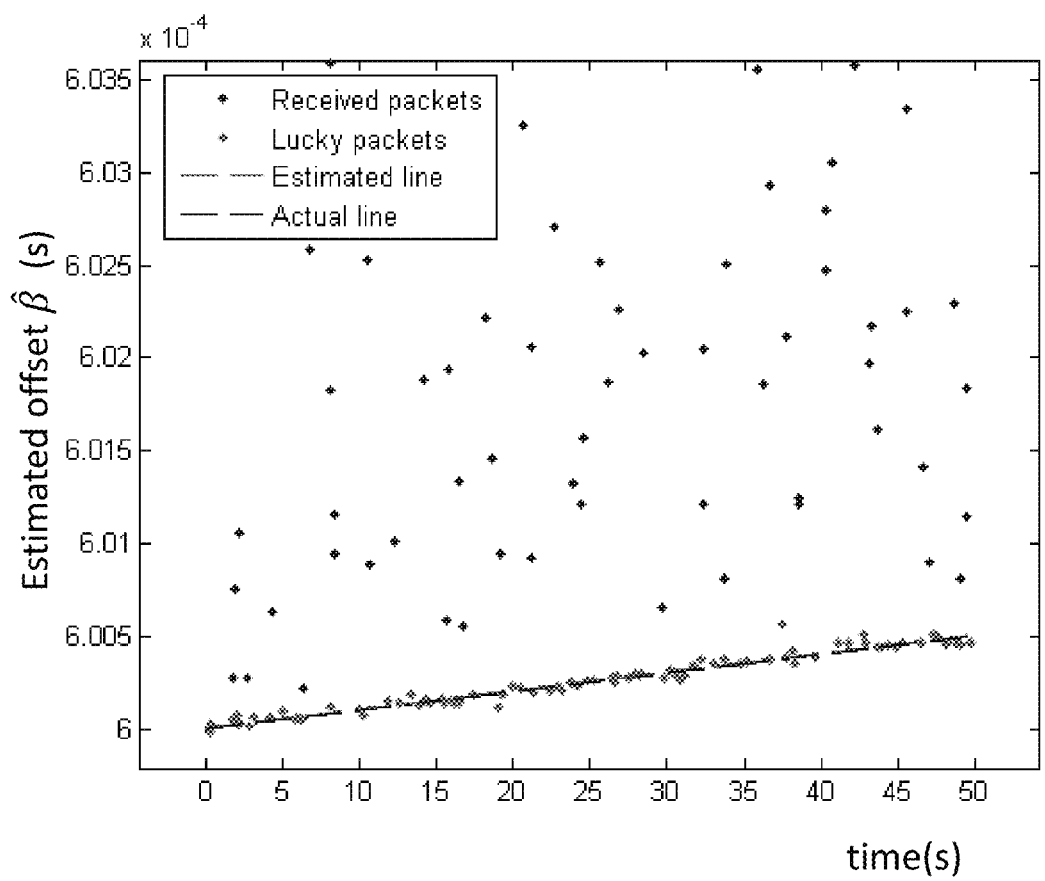
FIG. 5 shows an example of a plot of the estimated offset $\hat{\beta}$ of received packets, including lucky packets, vs. time, together with an estimated line and actual line.
Figure 6:
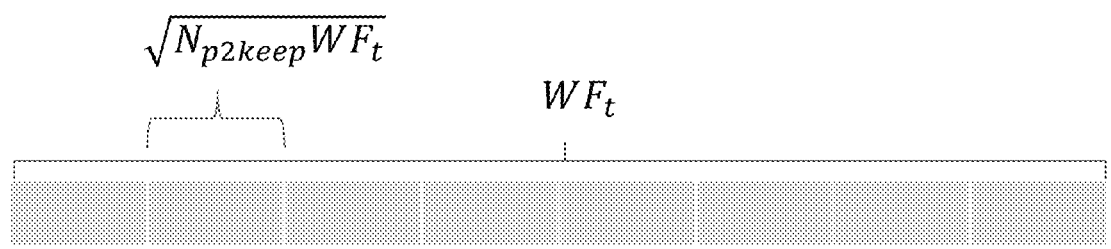
FIG. 6 shows a schematic block diagram representing a number of saved frames $\sqrt{N_{p2keep}}WF_t$ for a time window W and a frame rate $F_t$.

FIG. 5 shows an example of a plot of the estimated offset $\hat{\beta}$ of received packets, including lucky packets, vs. time, for some test results, together with an estimated line and actual line. As illustrated, for an actual frequency drift of 10 ppb, the estimated frequency drift was 9.51 ppb. For an actual offset of 600 μs, the estimated offset $\hat{\beta}$ was 600.015 μs.

Estimation Error

The method may further comprise computing the estimation error of the estimated frequency drift $\hat{\alpha} \in \{\hat{\alpha}_{12}, \hat{\alpha}_{34}\}$ and the estimated offset $\hat{\beta} \in \{\hat{\beta}_{12}, \hat{\beta}_{34}\}$, which are denoted by $\Delta\hat{\alpha}$ and $\Delta\hat{\beta}$, respectively, as follows:

define a Confidence Level, CL %, such that $\Pr(\alpha \in [\hat{\alpha}-\Delta\hat{\alpha}, \hat{\alpha}+\Delta\hat{\alpha}]) \leq CL\%$, and $\Pr(\beta \in [\hat{\beta}-\Delta\hat{\beta}, \hat{\beta}+\Delta\hat{\beta}]) \leq CL\%$;

let $t_{n_{LP}-2}^*$ denote the $(1-(1-CL/100)/2)$ quantile of a student $t_{n_{LP}-2}$ distribution (i.e. Student's t-distribution with $n_{LP}-2$ degrees of freedom);

for CL=99%, the following approximation can be used $$t_{n_{LP}-2}^* \approx 2.578 + 26660 e^{-2.0265 n_{LP}};$$

$$\text{let } S_\alpha = \sqrt{\frac{\frac{1}{n_{LP}-2}(y-(\hat{\alpha}x+\hat{\beta}))^T(y-(\hat{\alpha}x+\hat{\beta}))}{(x-\bar{x})^T(x-\bar{x})}},$$

$$S_\beta = S_\alpha \sqrt{\frac{x^T x}{n_{LP}}},$$

then the estimation errors are given by:

$$\Delta\hat{\alpha} = S_\alpha t_{n_{LP}-2}^*$$

$$\Delta\hat{\beta} = S_\beta t_{n_{LP}-2}^*$$

Reducing Adverse Effects of Congestion with a Variable and Fixed Window Sizes

The method for clock synchronization may further comprise reducing the adverse effects of congestion, comprising checking the frequency estimation error of the forward link (using $t_1$ and $t_2$) and reverse link (using $t_3$ and $t_4$), and then adjusting the slave clock based on the link that has the least frequency estimation error. Higher estimation error is highly correlated with high congestion. If both links have a high estimation error, then the window size is increased. If the estimation error is less than a maximum estimation error, then the window size may be decreased.

The following parameters are defined:
min–$n_{LP}$: minimum number of lucky packets
max–freq–error: maximum frequency estimation error
$\Delta W$: amount of linear decrease in window size
c: multiplicative factor to increase window size (c>1)
$K_p$: proportional gain of the PI (Proportional Integral) controller of the processing unit implementing the algorithm
$K_I$: integral gain of PI-controller
f: a clock frequency and, defining the following notations:
$\hat{\alpha}_{12}$: estimated frequency drift in the forward link
$\hat{\alpha}_{34}$: estimated frequency drift in the reverse link
$\hat{\beta}_{12}$: estimated offset in the forward link
$\hat{\beta}_{34}$: estimated offset in the reverse link
$\Delta\alpha_{12}$: frequency estimation error in the forward link
$\Delta\alpha_{34}$: frequency estimation error in the reverse link.

The method then comprises performing steps defined by the following pseudocode:

```
If n_LP in the forward link >= min – n_LP AND n_LP in the
  reverse link >= min – n_LP
AND
Δα_12 ≤ max – freq – error AND Δα_34 ≤ max – freq – error
If Δα_12 ≤ Δα_34:
    f = f – (K_p α̂_12 + K_I (β̂_12 – tmpd))
    W := W – ΔW
Else
    f = f + (K_p α̂_34 + K_I ( β̂_34 – tmpd))
    W := W – ΔW
EndIf
Elseif n_LP in the forward link >= min – n_LP AND Δα_12 ≤ max –
  freq – error
    f = f – (K_p α̂_12 + K_I (β̂_12 – tmpd))
    W := W – ΔW
Elseif n_LP in the reverse link >= min – n_LP AND Δα_34 ≤ max –
  freq – error
    f = f + (K_p α̂_34 + K_I ( β̂_34 – tmpd))
    W := W – ΔW
Else    W := cW
EndIf
```

In a variation of this embodiment, to provide a lower-complexity implementation, the method comprises performing steps defined by the following pseudocode:

```
If n_LP in the forward link >= min – n_LP AND n_LP in the
  reverse link >= min – n_LP
If n_LP in the forward link≥ n_LP in the reverse link:
    f = f – (K_p α̂_12 + K_I (β̂_12 – tmpd))
    W := W – ΔW
Else
    f = f + (K_p α̂_34 + K_I ( β̂_34 – tmpd))
    W := W – ΔW
EndIf
Elseif n_LP in the forward link >= min – n_LP
    f = f – (K_p α̂_12 + K_I (β̂_12 – tmpd))
    W := W – ΔW
Elseif n_LP in the reverse link >= min – n_LP
    f = f + (K_p α̂_34 + K_I ( β̂_34 – tmpd))
    W := W – ΔW
Else
    W := cW
EndIf
```

In a method for clock synchronization according to another embodiment, the method provides a low-complexity implementation with a constant window size and method comprises performing steps defined by the following pseudocode:

```
If n_LP in the forward link >= min - n_LP AND n_LP in the
reverse link >= min - n_LP
    If n_LP in the forward link >= n_LP in the reverse link:
            f = f - (K_p α̂_12 + K_I (β̂_12 - tmpd))
    Else
            f = f + (K_p α̂_34 + K_I (β̂_34 - tmpd))
    EndIf
Elseif n_LP in the forward link >= min - n_LP
            f = f - (K_p α̂_12 + K_I (β̂_12 - tmpd))
Elseif n_LP in the reverse link >= min - n_LP
            f = f + (K_p α̂_34 + K_I (β̂_34 - tmpd))
Else
    Do not adjust the frequency
EndIf
```

Reducing Memory Storage

In yet another embodiment, the method for clock synchronization may further comprise reducing the memory storage required to estimate the frequency drift $\hat{\alpha}$ and offset $\hat{\beta}$, from complexity $O(W)$ to complexity $O(\sqrt{W})$.

A method of this embodiment comprises obtaining timestamps for every $\sqrt{N_{p2keep} WF_t}$ packets, as illustrated schematically in FIG. 5, and storing only $N_{p2keep}$ "lucky packets". Lucky packets are as defined above, for the forward link and for the reverse link.

Then the frequency drift $\hat{\alpha} \in \{\hat{\alpha}_{12}, \hat{\alpha}_{34}\}$ and offset $\hat{\beta} \in \{\hat{\beta}_{12}, \hat{\beta}_{34}\}$ are estimated for the stored $\sqrt{N_{p2keep} WF_t}$ "lucky packets". Note that in this case, the maximum number of packets that need to be stored is less than $2\sqrt{N_{p2keep} WF_t}$.

Example: For $W F_t = 3840$ packets, and $N_{p2keep} = 4$ packets, the maximum number of packets that need to be stored is $\leq 248$ packets, which is much less than 3840 packets.

Further reduction in storage requirements can be achieved by choosing a short observation window size ("small window"), of a fixed size, which is sufficient to obtain a desired minimum number of lucky packets, and running the above procedure recursively, for a plurality of said small windows. In general, it is possible to achieve storage of complexity $O(^{n+1}\sqrt{W})$, where n is the number of times the above procedure is run.

Holdover Time and Declaring Loss of Synchronization

The method may further comprise computing a maximum holdover time and declaring loss of synchronization:
let MaxSynchError denote the maximum tolerable synchronization error between the master clock and slave clock;
for a given Confidence level, CL %, obtain the estimation errors on $\hat{\alpha}$ and $\hat{\beta}$, which are denoted by $\Delta\hat{\alpha}$ and $\Delta\hat{\beta}$, as explained above;

defining a maximum hold over time =

$$\max\left(\frac{|MaxSynchError - (\hat{\beta} - tmpd)| + \Delta\hat{\beta}}{\min(|\hat{\alpha} + \Delta\hat{\alpha}|, |\hat{\alpha} - \Delta\hat{\alpha}|)}, 0\right);$$

and declaring loss of synchronization if $|\hat{\beta} - tmpd| + \Delta\hat{\beta} \geq MaxSynchError.$ Thus, loss of synchronization is declared if this condition is met, e.g. if methods for clock synchronization comprising running one of the algorithms as described herein cannot achieve synchronization.

As described above, methods for clock synchronization based on the IEEE1588 PTP, according to embodiments of the present invention, comprise obtaining a plurality of timestamps, and using a combination of linear programming and linear regression to obtain the estimated the frequency drift $\hat{\alpha} \in \{\hat{\alpha}_{12}, \hat{\alpha}_{34}\}$ and estimated offset $\hat{\beta} \in \{\hat{\beta}_{12}, \hat{\beta}_{34}\}$ for the forward and reverse links between a master clock and a slave clock, and estimation of the accuracy of $\hat{\alpha}$ and $\hat{\beta}$, i.e. $\Delta\hat{\alpha}$ and $\Delta\hat{\beta}$. The time window size W may be fixed or variable, and the time window size W is selected to achieve a desired accuracy of $\hat{\alpha}$ and $\hat{\beta}$.

An initial window size W is chosen based on simulations or experiment, since this value depends on actual hardware and equipment being used. Similarly, whether a fixed window size is used, or a variable window size is required, depends on whether or not synchronization can be achieved to meet system requirements, for example, to achieve synchronization within 500 ns, or with 100 ns or less, and with a desired level of confidence.

Beneficially, the method comprises performing packet delay filtering, defining a subset of a plurality of received packets referred to as lucky packets, and then performing linear regression for the lucky packets. Optionally, a recursive method using a small window size provides for reduced memory storage.

This approach is distinguished from known drift estimation schemes, such as those disclosed by Iantosca et al., ref. (3), and Anyaegbu et al., ref. (6), in the way packet delay filtering is performed in Step 3. In particular, in references (3) and (6), packet filtering is performed by dividing the time-stamps window into small windows, and selecting only one packet from each small window that corresponds to the packet with the minimum delay, i.e., selecting a minimum $t_2 - t_1$, in each small window.

The method may further comprise estimating a maximum holdover time, and declaring loss of synchronization when synchronization is lost with the desired level of confidence. The maximum holdover time indicates the amount of time the system can maintain time synchronized in free-run without adjusting the clock.

System Architecture

IEEE1588 PTP provides a protocol for synchronization where an alternative shared timing source is not practical, or where other options for synchronization of distributed network devices having individual clocks to a GPS satellite or an NTP time server are not available. The methods of embodiments described herein are particularly applicable for wireless backhaul networks comprising a plurality of fixed (stationary) nodes comprising hubs and RBMs, such as illustrated schematically in FIG. 1, where each hub serves one or more RBMs through wireless radio links, and where synchronization of uplink and downlink communications between hubs and RBMs across the wireless backhaul network is required. As illustrated schematically in FIG. 2, the wireless backhaul network may further comprise a centralized control node, such as a control server, which is in communication with each hub. It will be apparent that appropriate synchronization of uplink and downlink communications between each node of the wireless backhaul network (i.e. control server, hubs and RBMs) is required, as mentioned above.

For application to such the wireless backhaul network, the master clock may be a Grand Master high precision network clock outside the wireless backhaul network, i.e. an internet accessible master clock. It may alternatively be a high precision master clock provided in the centralized server/control node of the wireless backhaul network. The clock of the centralized server may act as a boundary clock, i.e. act as a master clock for the wireless backhaul network, which itself maintains close synchronization with a best master or grand master clock outside the wireless backhaul network.

Thus, by way of example only, in a system according to an embodiment of the invention, comprising a wireless backhaul network having a network topology as illustrated schematically in FIGS. 1 and 2, each hub comprises a slave clock. Each hub also comprises storage means storing data and software/programming instructions, and a processor for running software for implementing its network functions, including a method for synchronization with its designated master clock. The latter may be a master clock of the centralized control server or an internet accessible IEEE 1588 master clock. Thus each hub is capable of implementing clock synchronization by a method of an embodiment as described above.

For synchronization of the hubs and their served RBMs, the slave clock of each hub may act as a master clock for its served RBMs. That is the network provides hierarchical clock synchronization for hubs and RBMs. Processing to perform clock synchronization according to embodiments of the invention may be performed by local or distributed processing means. For example, the processing means may comprises local processing units of each node, e.g. each hub and RBM, and/or a centralized control server, or the processing means may comprise distributed processing units, e.g. may be distributed amongst processors of some or all nodes.

Depending on network requirements, and processing capabilities of each hub and RBM, a fixed or variable window size W may be used, to obtain synchronization with a desired accuracy or level of confidence. If synchronization with a desired accuracy or level of confidence is not initially achieved, the window size is increased. An algorithm using a variable window size may be implemented. For example, if the level of confidence is not achieved, the window size is incrementally increased. On the other hand, if the level of confidence is exceeded, the window size is successively decreased to a minimum value that achieves a required level of confidence. Application of a smaller window size, which obtains a minimum number of lucky packets, reduces computational complexity and storage requirements. To reduce storage and computational requirements, recursive computation based on lucky packets for a plurality small window sizes reduces computational complexity. On the other hand, if the algorithm cannot obtain synchronization with the desired level of confidence, and e.g. a maximum holdover time is exceeded, or other requirements are not met, and a method using a selected algorithm and selected parameters such as fixed or variable window size W, cannot achieve synchronization, a loss of synchronization may be declared.

In one embodiment, each hub comprises a PI (proportional integral) controller to provide for implementation of clock synchronization using a second order control loop.

To synchronize hub-RBM communications, each RBM may also comprise a clock and processor for implementing clock synchronization. That is the clock of each hub acts as a master clock for its serving RBMs, and a clock of each RBM acts as a slave clock. Thus each RBM served by a hub may implement clock synchronization with the respective "master" clock of its hub.

In a method of another embodiment, clock synchronization of hubs and RBMs may be coordinated by a control node, such as a centralized control server which manages control functions of the wireless backhaul network.

Thus, it will be apparent that nodes of the network, e.g. individual hubs, RBMs or a centralized control server, may perform clock synchronization locally, or all or some of these nodes may act as a distributed system to provide clock synchronization across the wireless backhaul network.

Simulation Results
Packet Delay Variation Vs. Jitter

FIGS. 7A, 7B, 8A and 8B show examples of some simulation results for application of clock synchronization according to embodiments of the present invention, for ITU test cases 12, 13, 14 and 17. Ref. (3) "Recommendation ITU-T G.8260 (2012)", discloses definitions and terminology for synchronization in packet networks, including ITU test cases 12, 13, 14 and 17.

Figure 7A:
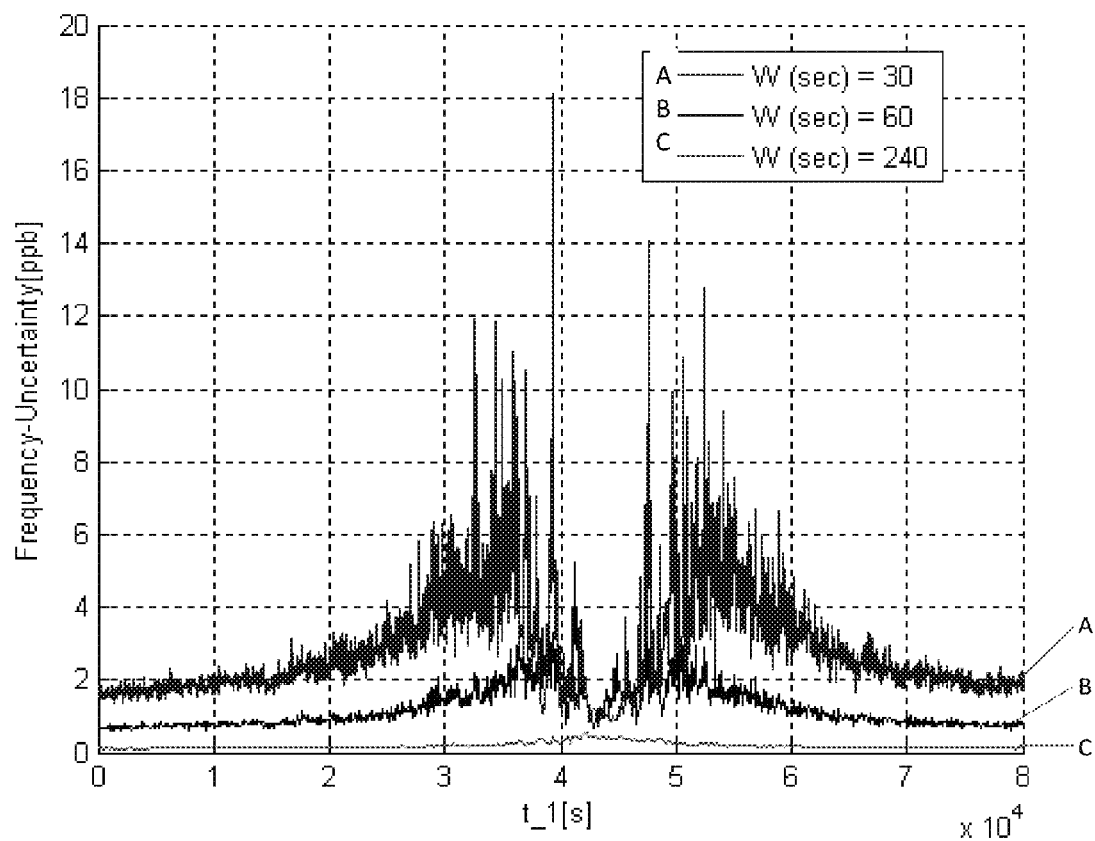
Figure 7B:
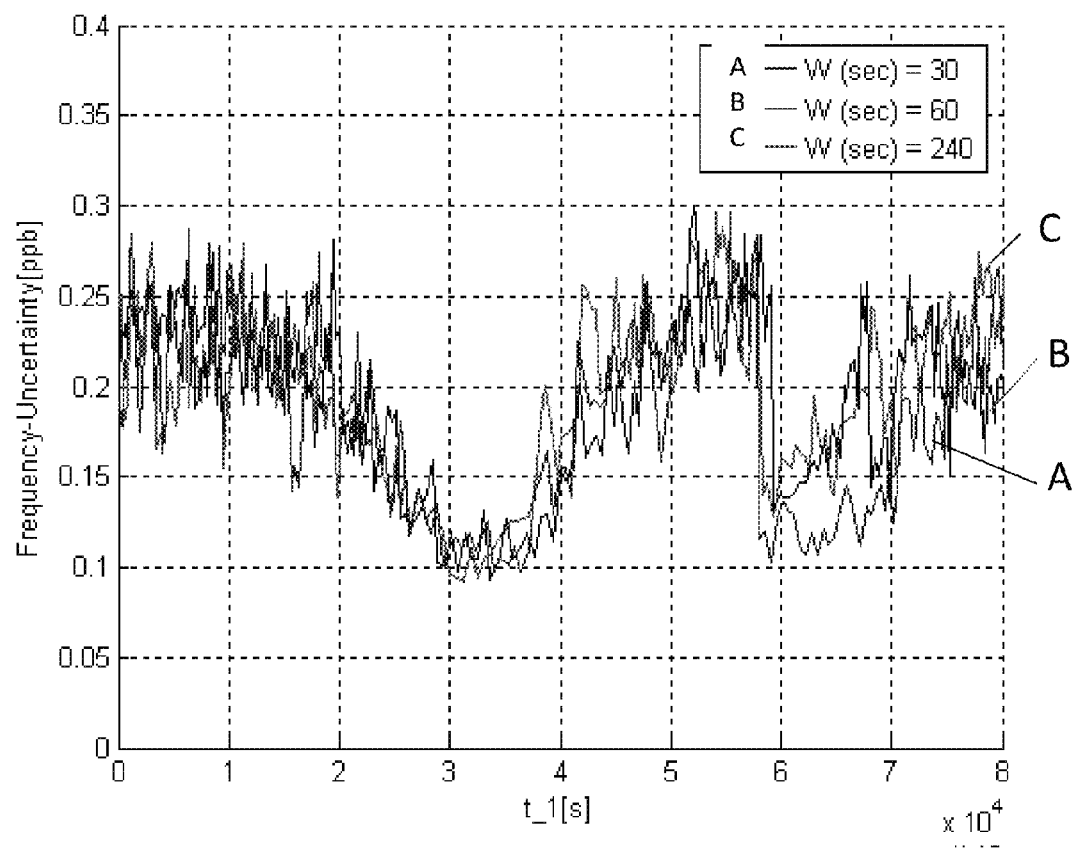

FIG. 7A shows a plot of the frequency uncertainty in parts-per-billion (ppb) vs. time for a fixed window size, for ITU test case 14a. The frequency uncertainty in parts-per-billion (ppb) reflects the inaccuracy in estimating the drift. It can be seen from these data that performing clock synchronization according to embodiments of the present invention, using a larger window size, reduces the frequency uncertainty. FIG. 7B shows a plot of the frequency uncertainty in parts-per-billion (ppb) vs. time, for a variable or adaptive window size, for ITU test case 14a. In comparing the results, note that scale of the frequency uncertainty in FIG. 7B has a range 0 to 0.4, whereas in FIG. 7A, the frequency uncertainty scale has a range from 0 to 20. These data illustrate that performing clock synchronization according to embodiments of the present invention, using an adaptive window size, reduces the frequency uncertainty significantly compared to using a fixed window size.

Figure 8A:
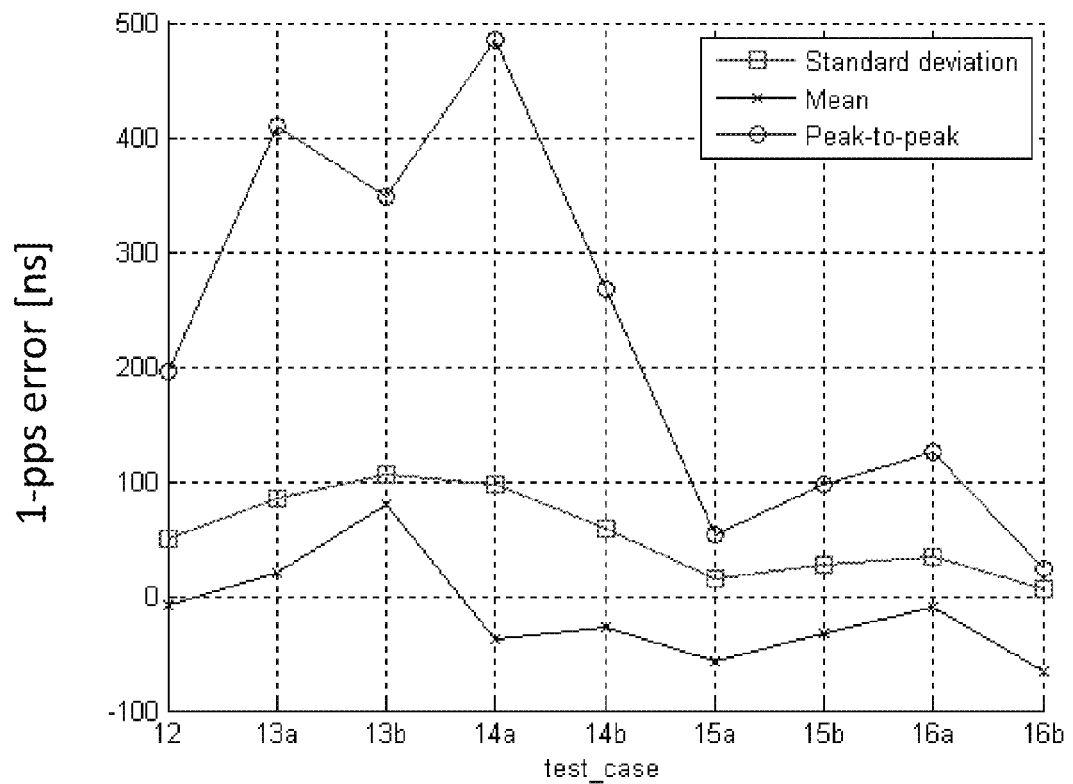
FIG. 8A shows the mean, standard deviation, and peak-to-peak 1-pps synchronization error resulting from a method of an embodiment for ITU test cases 12 to 16.
Figure 8B:
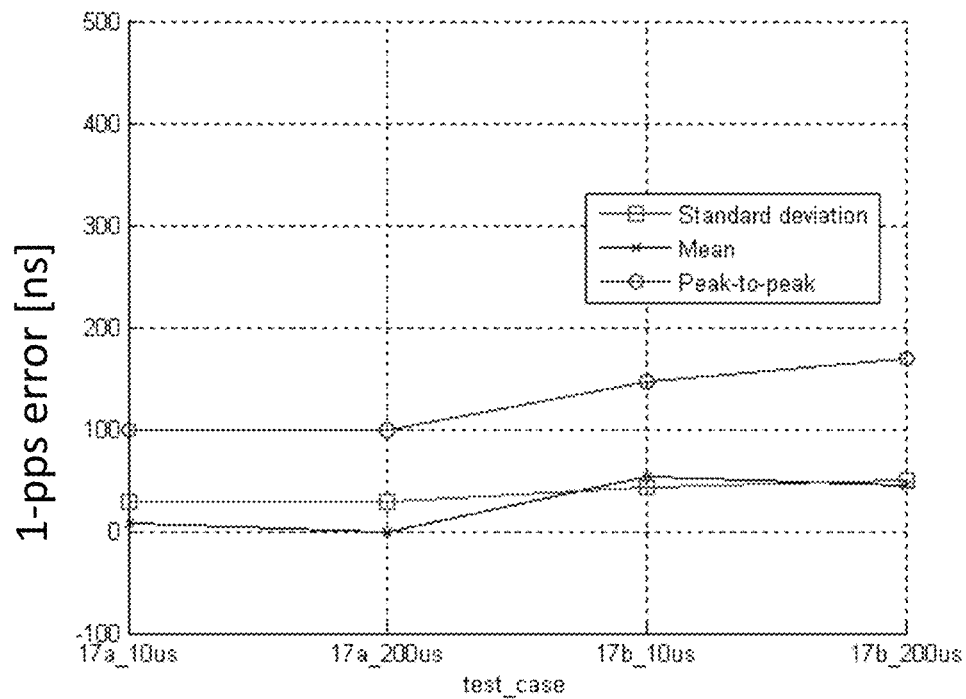
FIG. 8B shows the mean, standard deviation, and peak-to-peak 1-pps synchronization error resulting from the method of the embodiment, for ITU test case 17.

FIG. 8A shows a plot of the mean, standard deviation, and peak-to-peak 1-pps synchronization error for clock synchronization using, for ITU test cases 12 to 16, for an adaptive window size. FIG. 8B shows a plot the mean, standard deviation, and peak-to-peak 1-pps synchronization error that result from the proposed system and methods, for ITU test cases 17, for an adaptive window size. These data illustrate that clock synchronization according to embodiments of the invention provide high synchronization accuracy with maximum peak-to-peak 1-pps synchronization error less than 500 ns.

Thus methods and systems for clock synchronization using IEEE1588 PTP in a fixed wireless backhaul networks according to embodiments of the invention described herein provide for:

estimation of frequency drift and offset in the forward and reverse links using a combination of linear programming and linear regression, for a window size of W seconds;

estimation of the accuracy of the estimated frequency drift $\hat{\alpha}$ and estimated offset $\hat{\beta}$;

use of a variable window size to achieve a desired accuracy of estimated frequency drift $\hat{\alpha}$ and estimated offset $\hat{\beta}$.

The method optionally comprises estimating a maximum holdover time with a desired level of confidence, and declaring whenever the slave clock has lost synchronization with the desired level of confidence, and then performing clock synchronization.

Methods are also disclosed for reducing the adverse effects of congestion, including a low-complexity implementation with a variable window size and a low-complexity implementation with a constant window size.

Methods are also disclosed for reducing the memory storage required for estimating $\hat{\alpha}$ and $\hat{\beta}$.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A method for clock synchronization in a fixed wireless backhaul network using IEEE1588 Precision Time Protocol (PTP), the wireless backhaul network comprising a plurality of fixed nodes, each node comprising a hub or a Remote Backhaul Module (RBM), wherein each hub serves one or more Remote Backhaul Modules (RBMs), and wherein each hub comprises a slave clock, and each slave clock communicates with a master clock through a forward link (master-to-slave) and a reverse link (slave-to-master), the method comprising, for each slave clock, the steps of:

for a frame rate of $F_t$ and a time window size W, during each time window W, obtaining a plurality of timestamps, comprising $t_1$ and $t_2$, for the forward link and $t_3$ and $t_4$, for the reverse link, and storing said plurality of time stamps;

determining from said stored time stamps, for said time window W, an estimated frequency drift $\hat{\alpha}$ and estimated offset $\hat{\beta}$ for each of the forward and reverse links;

determining an estimation error $\Delta\hat{\alpha}$ of the estimated drift frequency drift $\hat{\alpha}$ and an estimation error $\Delta\hat{\beta}$ of the estimated offset $\hat{\beta}$ for each of the forward and reverse links;

determining which of the forward and reverse links is a least congested link; and if the estimation errors $\Delta\hat{\alpha}$ and $\Delta\hat{\beta}$ of the least congested link are less than or equal to a predefined maximum estimation error, adjusting the slave clock based on said estimated frequency drift $\hat{\alpha}$ and estimated offset $\hat{\beta}$ of the least congested link;

otherwise, changing the window size and repeating the preceding steps until the estimation errors $\Delta\hat{\alpha}$ and $\Delta\hat{\beta}$ of the least congested link are less than or equal to a predefined maximum estimation error, or, declaring loss of synchronization.

2. The method of claim 1, wherein, if the estimation error errors $\Delta\hat{\alpha}$ and $\Delta\hat{\beta}$ of the least congested link are greater than the maximum estimation error, incrementally increasing the time window size by a factor c, where c is greater than one, and repeating said steps until the estimation errors $\Delta\hat{\alpha}$ and $\Delta\hat{\beta}$ of the least congested link are less than or equal to the predefined maximum estimation error.

3. The method of claim 1, wherein, if the estimation error errors $\Delta\hat{\alpha}$ and $\Delta\hat{\beta}$ of the least congested link are less than or equal to the maximum estimation error, successively decreasing the time window size by $\Delta W$ and repeating the preceding steps to obtain a minimum window size that provides estimation errors $\Delta\hat{\alpha}$ and $\Delta\hat{\beta}$ of the least congested link that are less than or equal to the predefined maximum estimation error.

4. The method of claim 1, wherein the least congested link of the forward and reverse links is determined as the link that results in the least estimation error.

5. The method of claim 1 further comprising, for each of the forward and reverse links, applying packet delay filtering to identify a plurality of lucky packets in said time window W, and applying linear regression on the plurality of lucky packets to obtain the estimated frequency drift $\hat{\alpha}$ and estimated offset $\hat{\beta}$.

6. The method of claim 1, wherein determining estimated frequency drift frequency drift $\hat{\alpha}$ and estimated offset $\hat{\beta}$ for the forward and reverse links comprises:

for the forward link, determining intermediate drifts and offset values $\tilde{\alpha}$, $\tilde{\beta}$, by solving the following optimization:

$$\min_{\tilde{\alpha},\tilde{\beta}} \sum_{i=1}^{WF_t} |t_2^{(i)} - t_1^{(i)} - \tilde{\alpha}(t_1^{(i)} - t_1^{(1)}) - \tilde{\beta}|$$

subject to $$t_2^{(i)} - t_1^{(i)} \geq \tilde{\alpha}(t_1^{(i)} - t_1^{(1)}) + \tilde{\beta}, \forall i \in \{1, \ldots, WF_t\}$$

performing packet delay filtering (PDV) comprising applying packet filtering using the said intermediate values $\tilde{\alpha}$, $\tilde{\beta}$, to identify lucky packets that satisfy the following condition:

$$LP = \{i : t_2^{(i)} - t_1^{(i)} \leq \tilde{\alpha}(t_1^{(i)} - t_1^{(1)}) + \tilde{\beta} + 6\sigma_J\}$$

$n_{LP} = |LP|$, number of lucky packets applying linear regression on the lucky packets to find the said estimated frequency drift frequency drift $\hat{\alpha}$ and estimated offset $\hat{\beta}$, and correspondingly, for the reverse link, determining intermediate drifts and offset values $\tilde{\alpha}$, $\tilde{\beta}$, by replacing $t_1$ with $t_4$ and $t_2 - t_1$ with $t_4 - t_3$ in the above optimization; and defining the offset in forward link as $O = \hat{\beta} - tmpd$ and the offset in the reverse link as $O = -(\hat{\beta} - tmpd)$.

7. The method of claim 6, further comprising performing jitter filtering using linear regression comprising:

for the forward link, let x, y, be two $n_{LP} \times 1$ vectors, given by $$x = \{t_1^{(i)} - t_1^{(i)} : i \in LP\}, y = \{t_2^{(i)} - t_1^{(i)} : i \in LP\}$$

wherein the estimated frequency drift and offset are given by $$\tilde{\alpha} = \frac{(x - \bar{x})^T(y - \bar{y})}{(x - \bar{x})^T(x - \bar{x})},$$

$$\tilde{\beta} = \bar{y} - \tilde{\alpha}\bar{x}$$

and, correspondingly, for the reverse link, replacing $t_1$ with $t_4$ and $t_2 - t_1$ with $t_4 - t_3$.

8. The method of claim 6, wherein, for a given Confidence level, CL %, estimating the estimation errors on $\hat{\alpha}$ and $\hat{\beta}$, denoted by $\Delta\hat{\alpha}$ and $\Delta\hat{\beta}$, respectively, such that $\alpha \in [\hat{\alpha} - \Delta\hat{\alpha}, \hat{\alpha} + \Delta\hat{\alpha}]$ and $\beta \in [\hat{\beta} - \Delta\hat{\beta}, \hat{\beta} + \Delta\hat{\beta}]$;

let $t_{n_{LP}-2}*$ denote the $(1-(1-CL/100)/2)$ quantile of student $t_{n_{LP}-2}$ distribution (Student's t-distribution with $n_{LP}-2$ degrees of freedom);

$$\text{let } S_\alpha = \sqrt{\frac{\frac{1}{n_{LP}-2}(y - (\hat{\alpha}x + \hat{\beta}))^T(y - (\hat{\alpha}x + \hat{\beta}))}{(x - \bar{x})^T(x - \bar{x})}},$$

$$S_\beta = S_\alpha \sqrt{\frac{x^T x}{n_{LP}}};$$

then, the estimation errors are given by $$\Delta\hat{\alpha} = S_\alpha t_{n_{LP}-2}*$$

$$\Delta\hat{\beta} = S_\beta t_{n_{LP}-2}*.$$

9. The method of claim 8 wherein, for CL=99%, the following approximation is used $t_{n_{LP}-2}* \approx 2.578 + 26660e^{-2.0265 n_{LP}}$.

10. The method of claim 6, wherein determining the least congestion link of the forward and reverse links comprises selecting the link that results in the largest number of lucky packets.

11. The method of claim 6, wherein:

```
If n_LP in the forward link >= min - n_LP AND n_LP in the
  reverse link >= min - n_LP
AND
Δα_12 ≤ max - freq - error AND Δα_34 ≤ max - freq - error
  If Δα_12 ≤ Δα_34:
    f = f - (K_p α̂_12 + K_I (β̂_12 - tmpd))
    W := W - ΔW
  Else
    f = f + (K_p α̂_34 + K_I ( β̂_34 - tmpd))
    W := W - ΔW
  EndIf
Elseif n_LP in the forward link >= min - n_LP AND Δα_12 ≤ max -
  freq - error
    f = f - (K_p α̂_12 + K_I (β̂_12 - tmpd))
    W := W - ΔW
Elseif n_LP in the reverse link >= min - n_LP AND Δα_34 ≤ max -
  freq - error
    f = f + (K_p α̂_34 + K_I ( β̂_34 - tmpd))
    W := W - ΔW
Else    W := cW
EndIf.
```

12. The method of claim 6, wherein:

```
If n_LP in the forward link >= min - n_LP AND n_LP in the
  reverse link >= min - n_LP
  If n_LP in the forward link≥ n_LP in the reverse link:
    f = f - (K_p α̂_12 + K_I (β̂_12 - tmpd))
    W := W - ΔW
  Else
    f = f + (K_p α̂_34 + K_I ( β̂_34 - tmpd))
    W := W - ΔW
  EndIf
Elseif n_LP in the forward link >= min - n_LP
    f = f - (K_p α̂_12 + K_I (β̂_12 - tmpd))
    W := W - ΔW
Elseif n_LP in the reverse link >= min - n_LP
    f = f + (K_p α̂_34 + K_I ( β̂_34 - tmpd))
    W := W - ΔW
Else
W := cW
EndIf.
```

13. The method of claim 6, wherein:

```
If n_LP in the forward link >= min - n_LP AND n_LP in the
  reverse link >= min - n_LP
  If n_LP in the forward link≥ n_LP in the reverse link:
        f = f - (K_p α̂_12 + K_I (β̂_12 - tmpd))
    Else
        f = f + (K_p α̂_34 + K_I ( β̂_34 - tmpd))
  EndIf
Elseif n_LP in the forward link >= min - n_LP
        f = f - (K_p α̂_12 + K_I (β̂_12 - tmpd))
Elseif n_LP in the reverse link >= min - n_LP
        f = f + (K_p α̂_34 + K_I ( β̂_34 - tmpd))
Else
    Do not adjust the frequency
EndIf.
```

14. The method of claim 6, wherein to reduce the memory storage required to estimate the frequency drift $\hat{\alpha}$ and offset $\hat{\beta}$, from complexity $O(W)$ to complexity $O(\sqrt{W})$, the steps of obtaining a plurality of time-stamps, comprising $t_1$ and $t_2$, for the forward link and $t_3$ and $t_4$, for the reverse link, and storing said plurality of time stamps comprises:

obtaining timestamps for every $\sqrt{N_{p2keep}WF_t}$ packets, where $N_{p2keep}$ is a number of packets to keep, and storing only $N_{p2keep}$ lucky packets, and estimating the frequency drift $\hat{\alpha} \in \{\hat{\alpha}_{12}, \hat{\alpha}_{34}\}$ and offset $\hat{\beta} \in \{\hat{\beta}_{12}, \hat{\beta}_{34}\}$ for the stored $\sqrt{N_{p2keep}WF_t}$ lucky packets.

15. The method of claim 14, further comprising selecting a small window having a short window size sufficient to obtain a desired minimum number of lucky packets, and performing said procedure recursively for a plurality of said small windows, thereby reducing the storage to $O(^{n+1}\sqrt{W})$, where n is the number of times the above procedure is run.

16. The method of claim 1 further comprising:

determining a maximum tolerable synchronization error, MaxSynchError, between the master clock and slave clock;

determining a target confidence level for synchronization; and declaring loss of synchronization if $$|\hat{\beta} - tmpd| + \Delta\hat{\beta} \geq \text{MaxSynchError}$$

where tmpd is the mean propagation delay.

17. The method of claim 1, further comprising determining a target confidence level for synchronization, MaxSynchError; and computing a maximum holdover time as:

$$\text{Maximum hold over time} = \max\left(\frac{|\text{MaxSynchError} - (\hat{\beta} - tmpd)| + \Delta\hat{\beta}}{\min(|\hat{\alpha} + \Delta\hat{\alpha}|, |\hat{\alpha} - \Delta\hat{\alpha}|)}, 0\right)$$

where $\hat{\beta}$ is the estimated offset, $\Delta\hat{\beta}$ is the estimation error on $\hat{\beta}$, $\hat{\alpha}$ is the estimated drift, $\Delta\hat{\alpha}$ is the estimation error on $\hat{\alpha}$, and tmpd is the mean propagation delay.

18. A system for clock synchronization using IEEE1588 precision time protocol (PTP) in a fixed wireless backhaul network comprising a plurality of nodes, said nodes comprising hubs and Remote Backhaul Modules (RBMs), wherein each hub serves one or more Remote Backhaul Modules (RBMs), each hub comprising a slave clock, and wherein each slave clock communicates with a master clock through a forward link (master-to-slave) and a reverse link (slave-to-master), and processor means comprising at least one processor and a computer readable storage medium, storing programming instructions for execution by said at least one processor, for implementing the method of claim 1.

19. A non-transitory computer readable storage medium in a fixed wireless backhaul network comprising a plurality of nodes, said nodes comprising hubs and Remote Backhaul Modules (RBMs), wherein each hub serves one or more Remote Backhaul Modules (RBMs), each hub comprising a slave clock, and wherein each slave clock communicates with a master clock through a forward link (master-to-slave) and a reverse link (slave-to-master), the non-transitory computer readable storage medium storing programming instructions for execution by at least one processor, for implementing a method for clock synchronization using IEEE1588 Precision Time Protocol (PTP), comprising, for each slave clock, the steps of:

for a frame rate of $F_t$ and a time window size W, during each time window W, obtaining a plurality of time-stamps, comprising $t_1$ and $t_2$, for the forward link and $t_3$ and $t_4$, for the reverse link, and storing said plurality of time stamps;

determining from said stored time stamps, for said time window W, an estimated frequency drift $\hat{\alpha}$ and estimated offset $\hat{\beta}$ for each of the forward and reverse links;

determining an estimation error $\Delta\hat{\alpha}$ of the estimated drift frequency drift $\hat{\alpha}$ and an estimation error $\Delta\hat{\beta}$ of the estimated offset $\hat{\beta}$ for each of the forward and reverse links;

determining which of the forward and reverse links is a least congested link; and if the estimation errors $\Delta\hat{\alpha}$ and $\Delta\hat{\beta}$ of the least congested link are less than or equal to a predefined maximum estimation error, adjusting the slave clock based on said estimated frequency drift $\hat{\alpha}$ and estimated offset $\hat{\beta}$ of the least congested link;

otherwise, changing the window size and repeating the preceding steps until the estimation errors $\Delta\hat{\alpha}$ and $\Delta\hat{\beta}$ of the least congested link are less than or equal to a predefined maximum estimation error, or, declaring loss of synchronization.

* * * * *